Figure 1:
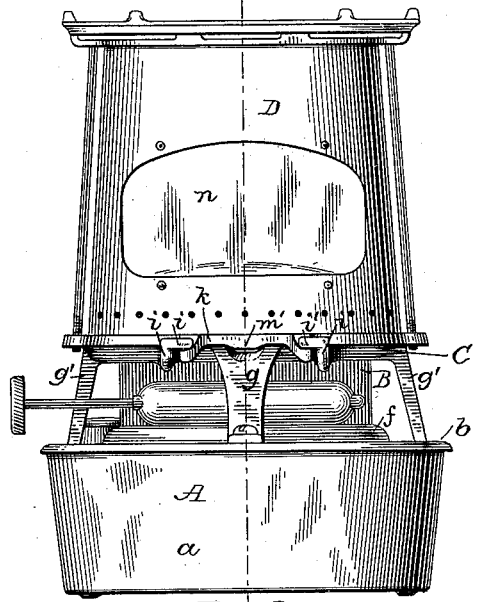

(No Model.) 3 Sheets—Sheet 1.

D. W. GOODELL & O. N. KYLE.
LAMP STOVE.

No. 343,535. Patented June 8, 1886.

Attest:
Philip F. Larner.
Howell Bartle.

Inventors:
Dexter W. Goodell
Oscar N. Kyle,
By Wm. C. Wood
Attorney.

(No Model.) 3 Sheets—Sheet 2.

D. W. GOODELL & O. N. KYLE.
LAMP STOVE.

No. 343,535. Patented June 8, 1886.

Attest:
Philip F. Larner
Howell Battle

Inventors:
Dexter W. Goodell
Oscar N. Kyle,
By
Attorney.

(No Model.) 3 Sheets—Sheet 3.
D. W. GOODELL & O. N. KYLE.
LAMP STOVE.
No. 343,535. Patented June 8, 1886.
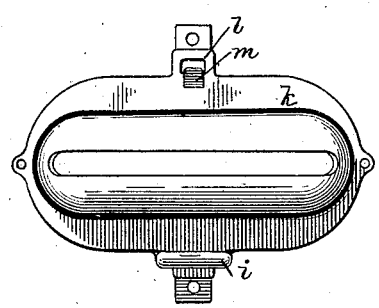
Fig. 8.
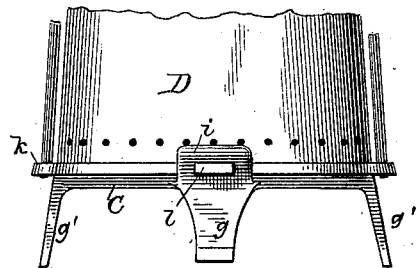
Fig. 9.
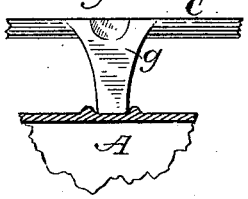
Fig. 14.
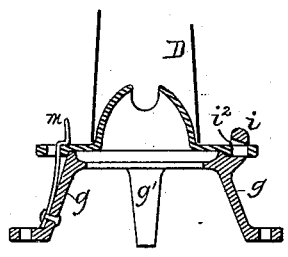
Fig. 10.
Fig. 11.
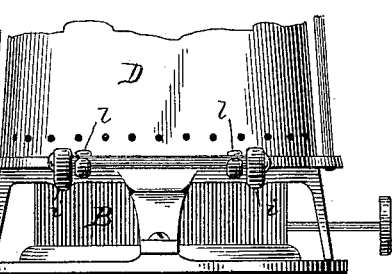
Fig. 12.
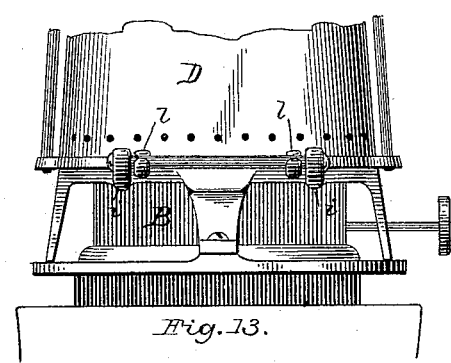
Fig. 13.
Attest:
Philip F. Larner.
Howell Bartle.
Inventors:
Dexter W. Goodell
Oscar N. Kyle.
By
Attorney.

United States Patent Office.

DEXTER W. GOODELL AND OSCAR N. KYLE, OF FLORENCE, MASSACHUSETTS, ASSIGNORS TO THE FLORENCE MACHINE COMPANY, OF SAME PLACE.

LAMP-STOVE.

SPECIFICATION forming part of Letters Patent No. 343,535, dated June 8, 1886.

Application filed October 15, 1885. Serial No. 179,944. (No model.)

*To all whom it may concern:*

Be it known that we, DEXTER W. GOODELL and OSCAR N. KYLE, both of Florence, a suburb of the city of Northampton, in the county of Hampshire and State of Massachusetts, have invented certain new and useful Improvements in Lamp-Stoves; and we do hereby declare that the following specification, taken in connection with the drawings furnished and forming a part of the same, is a clear, true, and complete description of our invention.

Our said improvements relate to that class of small light portable stoves which are adapted to be lifted and carried by one hand, and can be practically used both as a hand-lamp and as an oil-stove.

The general object of our invention, considered as a whole, is to produce at unusually low cost a neat and attractive stove of greater general efficiency than any others of its class of which we have knowledge.

One special object of our invention is to economically enlarge the value of such stoves when used as lamps. It is well known to be essential that the chimneys of such stoves be mainly composed of metal, in order that they may serve as drums and be able to properly support cooking utensils and their contents, and mica has been inserted in the sides of such chimneys for affording light; but suitable mica and its mounting is an item of considerable expense, and it is also desirable to have a dark side, and hence a single sheet of mica has usually been employed, and this has sometimes been located at the front side of the chimney and sometimes at the rear side, but we have now for the first time detachably mounted the chimney at its base and rendered it reversible, so that its position on the stove can be readily changed, and although it has but one sheet or pane of mica, it can be arranged either to throw light toward the person carrying it or toward the opposite side, after the manner of a "head-light." We have also in thus mounting the reversible chimney in its best form provided a slip or open hinge joint, so that for conveniently lighting the wick said chimney can be always swung or tilted in one direction, regardless of how the chimney may be placed on the stove, which enables a single latch to properly secure it in working position. Said open-hinge joints also enable the chimney to be easily lifted from the main portion of the stove, as is usually desirable for complete cleansing.

Another special object of our invention is to economize in the manufacture of such stoves in the matter of the number of parts and their simplicity, and in assembling. The necessity for a strong handle is apparent, and this we have cheaply provided for by constructing it in two parts or sections, respectively integral with the cup or basin of the oil-reservoir and its cover. In order that the said cup, its cover, and the upper portion of the stove mounted on and supported by said cover may be economically but effectively united, we have so devised and organized the parts that two screws only are required, thus also reducing the cost of assembling to a minimum.

In mounting the wick-tube on the reservoir a tight joint, accuracy in position, rigidity, and neatness are each of practical value, and to attain those ends we have provided the wick-tube with a metal petticoat or flange at its junction with the recessed top surface of the reservoir, and mounted said tube below said flange in a slot in the cover, so that when said tube and cover are soldered at the slot said flange affords a neat surface finish and serves as a lateral brace to the tube, and it also assures the proper rectangular position of said tube on the cover prior to and during the soldering operation, which can be rapidly and cheaply performed.

Certain minor features of invention have also been made by us, which, with those hereinbefore indicated, will be specified in the several clauses of claim hereunto annexed.

To more particularly describe our invention, we will refer to the drawings.

Figure 2:
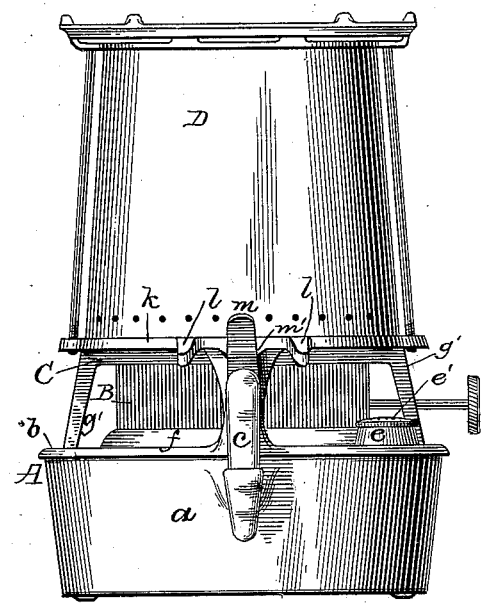
Figure 3:
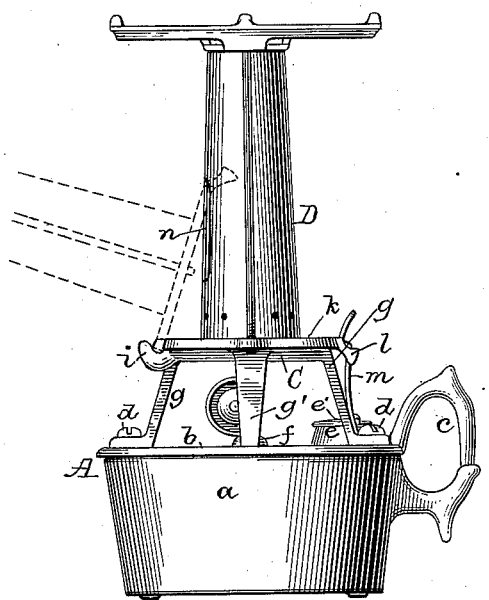
Figure 4:
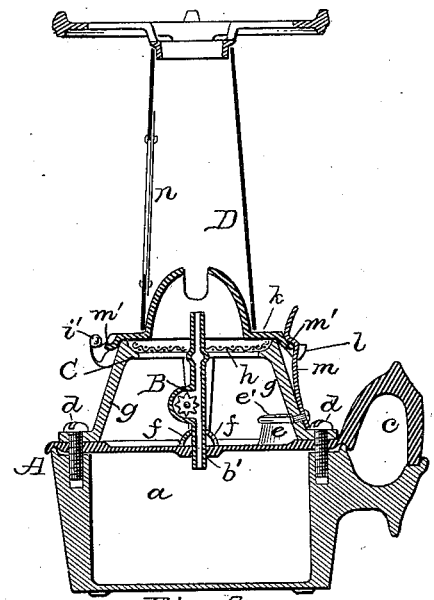
Figure 5:
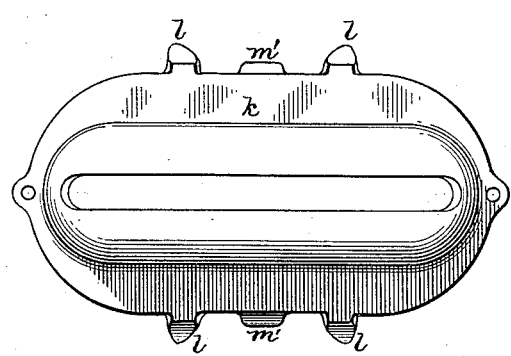
Figure 5:
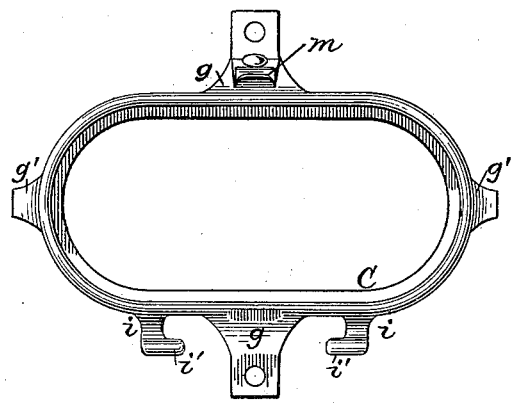
Figure 5:
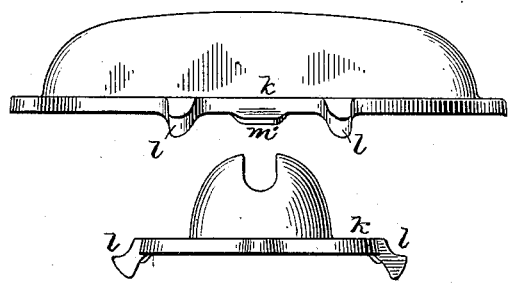
Figure 6:
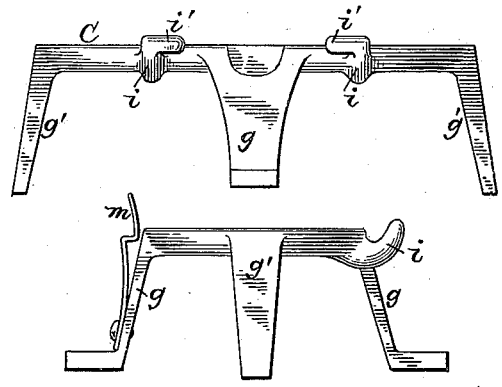
Figure 7:
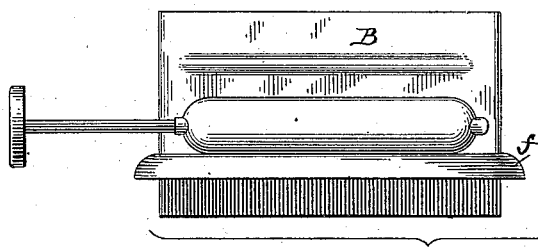
Figure 7:
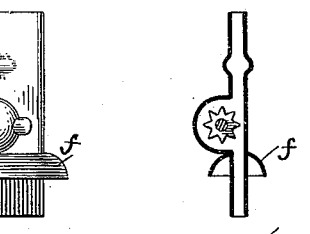

Figures 1, 2, and 3 are respectively the two side views and an end view of a stove embodying our invention in what we deem its best form. Fig. 4 is a central lateral section of the same on line $x$, Fig. 1. Fig. 5 in several views illustrates the cone-plate detached from the chimney and the stove. Fig. 6 in several views illustrates the stand on which the chimney and cone-plate are mounted, but detached therefrom and from the reservoir. Fig. 7, in side view and lateral section, illustrates the wick-tube detached from the stove. Figs. 8, 9, and 10, in top, side view, and lateral section, illustrate the lower portion of a detachable and reversible chimney and a cone-stand wherein the hinging function is not provided for. Figs. 11, 12, and 13 illustrate in section and two side views a stove having a reversible chimney, to the base of which the chimney-latch is connected, instead of being connected to the reservoir or to a cone-stand. Fig. 14 illustrates a footless leg on the cone-stand and the top of the reservoir recessed to receive it.

The oil-reservoir or base A of the stove is composed of two parts, the cup or basin $a$ and the cover $b$, and while this divided construction is essential in connection with certain portions of our invention, said reservoir may be cast hollow and in one piece, as is common with the ordinary large oil-stoves, without departure from certain other portions of our invention. The handle $c$ is novel, as here shown, it being cast integrally with the reservoir, but in two parts, the upper part thereof being integral with the cover, and the lower part integral with the cup, so that when these latter are united a complete handle is formed, having the requisite strength, and one which can be produced at less cost than if separately cast and then attached, or if cast complete on either the cover or the basin. The cover and basin are united by two screws, $d$, the joint being made oil-tight by means of suitable cement and the clamping effect of the screws, and the two sections of the handle are confined by one or more of said screws, so as to form a complete handle, as clearly shown. If the cover and basin be integrally formed, the handle may be cast integrally or otherwise formed and applied without involving the use of the handle as devised by us. The feed-hole $e$ is in the top or cover of the reservoir, and is located at the same side as the handle, and hence no such forward tipping of the stove as is liable while carrying it will cause the oil to be spilt through the perforated cap $e'$, which should in all cases be employed. The wick-tube B is of the usual form, but at its junction with the top of the cover of the reservoir and below the usual spur-wheel chamber it is provided with the novel petticoat-flange $f$. The foot of the tube below said flange extends into a slot, $b'$, in said cover, and as said flange is first properly secured by means of solder to the tube the latter can be accurately and promptly mounted in its proper rectangular position on said cover by merely seating said flange thereon, thus enabling the tube and cover to be accurately soldered together, the surfaces at the slot of the cover being first electro-coppered to enable the solder to adhere to the cast-iron. As the soldering operation is performed while the cover is detached and bottom up, such solder as is liable to and does often flow through to the opposite surface of the cover is wholly hidden by said flange $f$, which thus assures neatness of finish, and as it extends horizontally on each side of the wick-tube the latter is firmly braced in its proper vertical position. It is, however, to be understood that the prime value of the petticoat or flange accrues when it is employed in connection with a recess to receive the edge of the flange, as will be described in connection with Figs. 11, 12, and 13. The cone-stand C is provided with legs $g$ and $g'$, which have their bearings on the top of the reservoir, the legs $g$ having feet with holes, through which the two screws $d$ pass, thus economically uniting the cone-stand, cover, and cup, both as to screws and their tapped holes, and also as to labor in assembling these parts. The legs $g'$ have no feet, but merely rest on the reservoir, and one of the legs $g$ may also be footless, if desired, although in that case it will be advisable, as shown in Fig. 14, that one or more of the footless legs be provided with a recessed seat in the top of the reservoir to guard against the swinging of the stand on the single screw by which it would then be secured, the second screw used then serving only to secure the cover at one side to the cup. As heretofore, the cone-stand is recessed on top for the reception of the usual perforated plate, $h$; but as a novel feature the cone-stand at one side thereof is provided with one or more lugs, $i$, which in their best form serve as parts of a slip or open hinge joint, but which may serve as mere keepers, co-operating with certain other lugs, without departure from certain portions of our invention, as will be hereinafter fully described. Although the cone-stand is thus provided with the lugs $i$, it is to be understood that said lugs are not dependent for their functions upon the mere fact that they are integral with or attached to a device which may properly be termed a "cone-stand," it being only necessary that said one or more lugs $i$ be stationary near the base of the chimney, and rigidly fixed upon or with relation to the reservoir, which serves as the base of the lamp-stove, so that they may properly interlock with other lugs on two sides of the chimney at its base, as will be hereinafter made fully apparent. The flattened chimney D has, as usual, a skeletonized turret at its top and a cone-plate, $k$, at its base, and these three parts are united by means of suitable screw-rods. Although the cone-plate is thus coupled to the chimney, it is to be understood that the cone-plate may be disconnected therefrom, provided the base of the chimney be provided at its two sides with one or more projecting lugs, $l$, which will engage with the one or more stationary lugs $i$ projecting at one side below the chimney. As here shown, the lugs $l$ are integral with the cone-plate, which serves as a base for the chimney, and it will be seen that the cone itself may or may not be integral with said plate without departure from this portion of our invention, the gist of which is a chimney which is rendered reversible because of the lugs $l$ and the lugs $i$ interlocking therewith, and cooperating with a spring-catch, $m$, or other well-known form of lamp-chimney latch. As here shown, said latch engages with either of the ledges or lugs $m'$ at the two sides of the base of the chimney, thus enabling the latter to be mounted with its mica pane $n$ at either side of the stove, as may be desired. In their best form the lugs $i$ (two in number) have round arms $i'$, which project horizontally from the lugs, and are preferably slightly elevated above the top of the cone-stand, and the lugs $l$, (four in number,) two on each side of the chimney-base, having concave or hooked faces for engaging with the lug-arms $i'$, so that pair of the lugs $l$ and the lugs $i$ serve as an open or slip hinge-joint by which the chimney is hinged, enabling it to be tilted, as indicated in dotted lines in Fig. 3, and at the same time enabling it to be freely detached while in a partially-tilted position. In connection with this open-hinge or slip hinge joint one of the catch ledges or lugs $m'$, when next the spring-latch, serves as a keeper therefor, and the other, on the opposite side of the chimney-base, serves as a stop for limiting the extent of the tilting movement of the chimney on the hinge-lugs, and enables the latter to fully support the chimney when in its fully inclined position. Although this hinging feature is generally desirable, the reversibility of the chimney can be provided for by the use of one or more straight lugs on each side of the chimney-base and one or more fixed or loop lugs or sockets located below the chimney—as, for instance, at one side of the cone-stand—into which said straight lugs can be loosely inserted endwise, as clearly illustrated in Figs. 8, 9, and 10, wherein the cone-stand C has the spring-latch $m$ passing through a hole in the lug $l$, which therefore serves as a keeper in lieu of the lugs $m'$ before described, there being two of these lugs, $l$, one on each side of the chimney-base, so that either of them can be loosely entered into the socket $i^2$ of the lug $i$, which projects from the opposite side of the cone-stand. With this construction the chimney is rendered both detachable and reversible, as with the slip-hinge joint, it being obvious that after moving the spring-latch the adjacent side of the chimney can be lifted above the top of the latch, and then admit of its lateral movement for disengaging the lug $l$ from the socket $i^2$.

It is to be further understood that while we prefer the construction illustrated in Figs. 1 to 7, inclusive, and make specific claim to many of the features therein contained, we do not limit ourselves to providing both sides of the chimney with the interlocking lugs, as we are well aware that if the chimney have the latch attached to it and projecting below it the cone-stand or equivalent chimney-support may then be provided with lugs at both sides thereof, instead of at one side only, and we deem this variation in arrangement fully within the main portion of our invention—as, for instance, as illustrated in Figs. 11, 12, and 13.

In the stove first described the lower lugs, $i$, are on only one side of the cone-stand, but, as shown in said last-named figures said lugs are on both sides of the cone-stand, and each pair is coupled together by means of a rod, which constitutes in substance the lug-arms $i'$ in said first-described stove. The upper lugs, $l$, instead of being on both sides of the chimney at its base, are at one side only, and therefore the chimney-latch $m$ is attached to the chimney and projects downward, so that its locking face engages with the under surface of the top of the cone-stand. With this construction the hinging feature may or may not be provided for, and yet such a stove would embody the main portion of our invention, in that it contains a reversible detachable chimney, a chimney-latch, and interlocking lugs which cooperate with said latch regardless of the reversal of the position of the chimney on its support.

It will be obvious from what has been herein disclosed that the form of the interlocking lugs may be widely varied without departure from certain portions of our invention, especially if the open-hinge feature be dispensed with and the detachable and reversible features be mainly desired.

If the oil-reservoir be cast in one piece, the cone-stand may be mounted on a solid neck, as shown in Figs. 11, 12, and 13, having a small (or even no) flange at its ends, but a wide flange at the center of its sides to afford a bearing for the legs of the stand, through which its fastening-screws pass.

The wick-tube petticoat-flange may be used advantageously with a solid or jointless reservoir in the manner shown. This neck is slotted, so as to snugly receive the tube below the flange, and the upper surface of the neck is recessed or grooved to receive the edge of the flange. The slot and tube are well charged with suitable cement, and the flange-groove, having been previously coppered, is filled with solder dust. The tube is then pressed into the slot until the edge of the flange is firmly seated in the recess, and then the soldering operation can be performed by means of a blow-pipe flame so directed into the recess as to melt and flood the solder evenly, and form a tight metal joint with the flange, which would be supplemented by the cemented joint at the slot.

It will be obvious that those portions of our invention which relate to the two-part handle and to the union of the cone-stand, cover, and basin will not be involved with an oil-reservoir constructed as shown in Figs. 11, 12, and 13.

Having thus described our invention, we claim as new and desire to secure by Letters Patent—

1. In a lamp-stove, the combination, substantially as hereinbefore described, of a chimney provided at each side of its base with one or more lugs, and a support for said chimney, which is provided at one side with one or more stationary lugs for engaging with said chimney-lugs, and a chimney-latch located opposite to said stationary lugs, whereby said chimney may be locked in position for service, but be readily detached and reversed, substantially as and for the purposes specified.

2. The combination, substantially as hereinbefore described, of a hand-lamp stove chimney having a cone-plate attached thereto and provided with one or more lugs on each side thereof, a chimney-support provided with a chimney-latch, and one or more stationary lugs located below said plate and opposite said latch and interlocking with said upper lugs and cooperating with the latch for locking the chimney in position for service, and enabling it to be readily detached from the stove and reversed in position thereon.

3. The combination of a chimney and a support therefor, one of these said devices being provided with lugs on both sides and the other with lugs on one side and a latch on the other side, said lugs on the one device engaging with those on one side of the other and forming, when thus engaged, an open-hinge joint, substantially as described, whereby the chimney can be readily detached and reversed in position.

4. The combination of the chimney provided with one or more lugs at the two sides of its base, and a cone-stand having at one side thereof a chimney-latch and at the opposite side thereof one or more lugs for interlocking with the chimney-lugs, substantially as described, and enabling the chimney to be readily detached and reversed in position.

5. The combination of the chimney provided with lugs, the chimney-support, also provided with lugs, which interlock with the chimney-lugs to form an open-hinge joint, the chimney-latch, and the lugs $m'$ at opposite sides of the chimney, substantially as described, whereby either of said lugs $m'$ may serve as a keeper for the latch or as a stop for limiting the tilting movement of the chimney, substantially as described.

6. In a lamp-stove, the combination, with a reservoir composed of a cup or basin and a cover, of a cone-stand mounted on said cover and secured thereto by one or more screws, which also secure said cover to the basin, substantially as described.

7. In a lamp-stove, the combination of the wick-tube provided with a surrounding petticoat or flange below the spur-wheel chamber, and a reservoir-top slitted to receive said tube below said flange and provided with a recess for receiving the edge of said flange, substantially as and for the purposes specified.

8. In the reservoir-base of a hand-lamp stove, the combination of a cast-metal cup or basin and a cast-metal cover, each having a section of a handle integral therewith, and one or more screws, which unite the cover and basin, and also confine said two sections in position to form a complete handle for the stove, substantially as described.

DEXTER W. GOODELL.
OSCAR N. KYLE.

Witnesses:
E. L. KIRBY,
ROBT. B. SMITH.